(12) United States Patent
Meritt-Powell

(10) Patent No.: US 7,208,083 B2
(45) Date of Patent: Apr. 24, 2007

(54) DISPOSABLE FILTER BAG FOR A POOL CLEANER

(75) Inventor: Michael A. Meritt-Powell, Oceanside, CA (US)

(73) Assignee: Zodiac Pool Care, Inc., Vista, CA (US)

( * ) Notice: Subject to any disclaimer, the term of this patent is extended or adjusted under 35 U.S.C. 154(b) by 36 days.

(21) Appl. No.: 10/917,790

(22) Filed: Aug. 13, 2004

(65) Prior Publication Data

US 2005/0040089 A1 Feb. 24, 2005

Related U.S. Application Data

(60) Provisional application No. 60/496,868, filed on Aug. 20, 2003.

(51) Int. Cl.
*E04H 4/16* (2006.01)
*B01D 29/27* (2006.01)

(52) U.S. Cl. ............... 210/167.17; 210/416.2; 210/448; 210/460; 15/1.7; 264/DIG. 48

(58) Field of Classification Search ............... 210/169, 210/232, 416.1, 416.2, 448, 459, 460; 15/1.7; 4/490; 264/DIG. 48
See application file for complete search history.

(56) References Cited

U.S. PATENT DOCUMENTS

| | | | |
|---|---|---|---|
| 3,822,754 A | 7/1974 | Henkin et al. | |
| 4,558,479 A | 12/1985 | Greskovics et al. | |
| 4,575,423 A | 3/1986 | Alanis et al. | |
| 4,589,986 A | 5/1986 | Greskovics et al. | |
| 4,618,420 A | 10/1986 | Alanis | |
| D288,373 S | 2/1987 | Alanis | |
| D294,963 S | 3/1988 | Alanis et al. | |
| 5,092,951 A * | 3/1992 | Popovich et al. | 156/184 |
| 5,863,425 A | 1/1999 | Herlehy et al. | |
| D409,341 S | 5/1999 | Van Etten et al. | |
| 6,117,059 A | 9/2000 | Besuyen et al. | |
| 6,169,045 B1 * | 1/2001 | Pike et al. | 442/352 |
| 6,241,899 B1 | 6/2001 | Ramos | |
| D468,067 S | 12/2002 | Stoltz et al. | |
| 6,665,900 B2 | 12/2003 | Wichmann et al. | |
| 6,740,233 B2 | 5/2004 | Stoltz et al. | |
| 2005/0029177 A1 * | 2/2005 | Peterson et al. | 210/169 |
| 2005/0236310 A1 * | 10/2005 | Meritt-Powell | 210/169 |

* cited by examiner

Primary Examiner—Fred G. Prince
(74) Attorney, Agent, or Firm—Dean W. Russell; Kilpatrick Stockton LLP

(57) ABSTRACT

An improved disposable filter bag for use with a pool cleaner of the type disclosed, for example, in U.S. Pat. Nos. 5,863,425; 4,558,479; and 3,822,754. The filter bag is formed from a porous filter material such as a non-woven spunbond polymer having marginal seams formed by direct welding, in the absence of additional adhesive material, to form a reinforced cuff defining an open bag mouth leading to a hollow bag interior. The cuff is configured for removable attachment to a downstream end of a pool cleaner suction mast, as by removable connection to a mounting collar as disclosed in U.S. Pat. Nos. 5,863,425; D409,341; D468,067; and 6,740,233. The filter bag incorporates a ported tab formed generally at an upper end thereof for facilitated removable coupling to a pool cleaner supply hose or the like which supports the filter bag in a generally upright orientation.

32 Claims, 3 Drawing Sheets

DISPOSABLE FILTER BAG FOR A POOL CLEANER

BACKGROUND OF THE INVENTION

This application claims the benefit of U.S. Provisional Application 60/496,868, filed Aug. 20, 2003.

This invention relates generally to improvements in automatic pool cleaners and related accessories therefor, wherein the pool cleaner is designed for travel within a swimming pool or the like to dislodge and collect debris. More specifically, this invention relates to an improved filter bag for removable mounting onto the pool cleaner for collecting debris, wherein the filter bag is designed for convenient and economical disposal following a single use cycle. The filter bag is formed from a porous filter material such as a non-woven spunbond polymer having marginal seams formed by direct welding, in the absence of additional adhesive material, to form a reinforced cuff defining an open bag mouth leading to a hollow bag interior.

Automatic swimming pool cleaners are well known in the art for use in maintaining a swimming pool in an overall state of cleanliness. In this regard, residential and commercial swimming pools normally include a standard water filtration system including a main circulation pump and related main filter unit for filtering the pool water. The filtration system is typically operated for several hours on a daily basis to draw water from the pool for flow through the main filter unit and subsequent return circulation to the pool, wherein the filter unit includes an appropriate filter media for collecting and thus removing solid debris such as fine grit and silt, twigs, leaves, insects, and other particulate matter suspended within the pool water. Although such filtration systems function efficiently to collect suspended particulate, it has been recognized that some particulate tends to settle onto submerged pool floor and wall surfaces and thus is not removed by the standard filtration system. Automatic swimming pool cleaners have been developed and are widely used to assist in a more thorough cleaning of the pool by directly collecting such settled matter, and/or by re-suspending the settled matter so that it can be collected by the main filter unit.

More specifically, in one common form, the automatic swimming pool cleaner comprises a relatively compact wheeled housing adapted to travel randomly over submerged floor and wall surfaces of the pool. The cleaner is normally connected by a water supply hose or the like to the standard filtration system, such as by connection to the positive pressure discharge side of the system as described in U.S. Pat. Nos. 5,863,425; 4,558,479; 4,589,986; and 3,822,754, and copending U.S. Ser. No. 10/397,939, now U.S. Pat. No. 6,665,900. The filtration system provides a water flow through the supply hose to the cleaner, wherein this water flow is typically used to create or induce an upwardly directed suction flow through a suction mast for vacuuming grit and debris through the suction mast into a porous filter bag mounted on an upper or downstream end thereof. The water flow through the pool cleaner may also be used to power a hydraulic drive means which causes the cleaner to travel about within the swimming pool.

In general terms, the filter bag is constructed from one or more sheets of the porous filter bag material with marginal edges attached or interconnected by seams to form a hollow bag interior with an open bag mouth adapted for removable connection onto the upper end of the pool cleaner suction mast. In the case of a traditional woven fabric bag material, these marginal seams have been formed typically by sewing. Such fabric-based filter bags beneficially accommodate relatively long-term usage, with periodic removal of the filter bag from the pool cleaner suction mast so that collected debris accumulated therein can be discarded followed by re-mounting of the filter bag onto the pool cleaner for a subsequent cycle of use. However, such re-usable filter bags can become worn and/or frayed over time and thus become unsightly, especially in combination with accumulation of residual debris that may including aged organic matter. Exemplary filter bags of this general type and related techniques for removable mounting onto the pool cleaner suction mast are shown and described in U.S. Pat. Nos. 4,618,420; D288,373; 4,575,423; D294,963; 4,589,986; 5,863,425; D409,341; and D468,067; and in copending U.S. Ser. No. 10/400,118, now U.S. Pat. No. 6,740,233.

More recently, single-use or disposable filter bags formed from a non-fabric or non-woven porous material has been proposed, wherein the bag material is shaped by marginal seams using a thermoplastic or heat-melt adhesive. See, for example, U.S. Pat. No. 6,241,899. Such disposable filter bags are intended for removal from the pool cleaner suction mast when the bag becomes substantially filled with debris, followed by mounting of a replacement disposable filter bag onto the pool cleaner for a subsequent use cycle. Such disposable filter bags, however, have exhibited inconsistent performance with occasional premature bag failure caused by rupture of the seam-forming adhesive material. It is believed that such bag failures have been attributable at least in part to deterioration of the adhesive material when exposed to sun, water and chemical conditions inherent in a swimming pool environment.

In addition, prevention of air entrapment is one important key to proper filter bag performance. Submerged pool cleaner devices are designed with a predetermined buoyancy or buoyancy characteristic to ensure that they can climb pool wall surfaces and traverse floor surfaces of a swimming pool without lifting or significant tilting relative to the pool surface being cleaned. If a filter bag non-woven material is selected that is too thick, air can become entrapped within the filter bag resulting in increased buoyancy and reduced cleaner performance. Adhesive coated filter bag materials and some non-woven materials with excessive point-bonding area can also contribute to this air entrapment problem due to attenuated air flow or reduced available surface area.

There exists, therefore, a need for further improvements in and to filter bags for pool cleaners, particularly with respect to an improved disposable filter bag designed for removable mounting onto the upper or downstream end of a pool cleaner suction mast, and for convenient and economical disposal together with particulate debris collected therein when the filter bag reached a substantially filled condition. The present invention fulfills these needs and provides further related advantages.

SUMMARY OF THE INVENTION

In accordance with the invention, an improved disposable filter bag and related method of construction are provided, wherein the improved filter bag is designed for use with a pool cleaner of the general type disclosed, for example, in U.S. Pat. Nos. 5,863,425; 4,558,479; and 3,822,754; and copending U.S. Ser. No. 10/397,939, now U.S. Pat. No. 6,665,900, which are incorporated by reference herein. The filter bag is formed from a porous filter material adapted for interconnecting marginal edges thereof by direct welding to form marginal seams without requiring additional adhesive material or adhesive coatings on the bag material. The filter bag material is marginally seamed to form a hollow bag interior in combination with an open bag mouth for receiving a flow of water and water-entrained debris from a pool cleaner suction mast.

In the preferred form, the filter bag material comprises a non-woven sheet material of selected porosity, such as a spunbond polymer suitable for direct-weld interconnection of marginal edges thereof to define marginal seams, and to shape the bag material to define the hollow bag interior with the mouth opening downwardly. The bag mouth may incorporate a reinforced cuff for removable connection with a mounting collar adapted for removable mounting onto the pool cleaner suction mast, such as a mounting collar of the type shown and described in U.S. Pat. Nos. 5,863,425; D409,341; D468,067; and copending U.S. Ser. No. 10/400,118, now U.S. Pat. No. 6,740,233, which are incorporated by reference herein. The bag mouth may also include alignment means such as an alignment port for interengagement with a mating alignment means such as an alignment pin on the mounting collar, for rotationally orienting the filter bag relative to the mounting collar. In a preferred filter bag configuration, a divider such as a divider seam may also be provided for subdividing the hollow bag interior into a primary flow chamber for receiving flow of water and water-entrained debris from the pool cleaner, and a secondary collection chamber for trapping and collecting the water-entrained debris, generally as shown and described in U.S. Pat. No. 4,618,420, which is incorporated by reference herein.

Direct weld processes for forming the marginal seams of the filter bag may include heat seaming or radio frequency (RF) seaming. A preferred bag material comprises a non-woven spunbond polypropylene.

The disposable filter bag also incorporates a ported tab formed integrally therewith, generally at an upper end thereof. This ported tab defines a laterally open port for interconnection with a support member used for coupling the upper end of the filter bag to a pool cleaner supply hose or the like, thereby retaining the filter bag in a generally upright orientation on the pool cleaner and preventing the filter bag from draping downwardly over and about the pool cleaner where it could otherwise become entangled in the cleaner wheels and/or scrape against pool surfaces. One preferred support member comprises a hose clasp as shown and described in copending U.S. Provisional Application No. 60/496,867, filed Aug. 20, 2003, which is incorporated by reference herein.

Other features and advantages of the invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
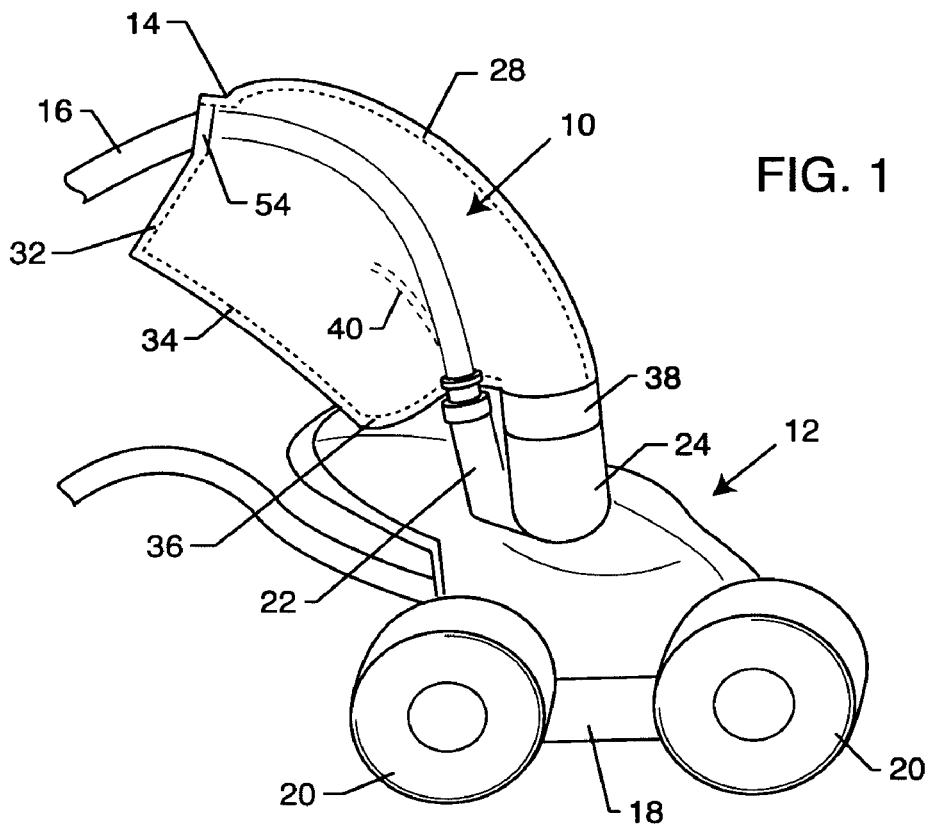
FIG. 1 is a perspective view of a pool cleaner having a disposable filter bag constructed in accordance with the novel features of the invention mounted at an upper or downstream end of a pool cleaner suction mast.

As shown in the exemplary drawings, an improved and disposable filter bag referred to generally the reference numeral 10 is provided for use with a pool cleaner 12. In operation, the pool cleaner 12 is designed for travel within a swimming pool (not shown) or the like to collect particulate debris such as sand and grit particles, leaves, twigs, and the like within the filter bag 10. When the filter bag 10 reaches a substantially filled condition, the filter bag is removable from the pool cleaner 12 for convenient and economical disposal together with the debris collected therein. A replacement filter bag 10 is installed quickly and easily onto the pool cleaner for collecting debris during a subsequent use cycle. In addition, the improved filter bag 10 includes an integrated tab 14 for facilitating connection of an upper end of the bag to a supply hose 16 or the like, thereby maintaining the filter bag on the pool cleaner in a generally upright orientation and correspondingly preventing the bag 12 from draping downwardly over and about the pool cleaner 12 where it could otherwise become entangled in the cleaner wheels and/or scrape against pool surfaces.

The improved disposable filter bag 10 of the present invention is designed for use with a conventional automatic swimming pool cleaner of the type adapted for substantially random travel throughout the volume of a swimming pool or the like to pick up and collect particulate debris within the filter bag 10, and/or to assist in suspending or re-suspending such particulate matter so that it can filtered from the pool water by a main filtration system (not shown). FIG. 1 depicts an exemplary pool cleaner 12 generally in accordance with the pool cleaner shown and described in U.S. Pat. Nos. D469,589 and 6,665,900, which are incorporated by reference herein. More particularly, the illustrative pool cleaner 12 comprises a relatively compact housing 18 carried on a plurality of wheels 20. An internal drive means (not shown) is provided for causing the pool cleaner 12 to travel about within the pool, traversing submerged pool floor and wall surfaces, with said internal drive means being typically powered hydraulically by a water flow coupled to a cleaner supply mast 22 via the supply hose 16 coupled to the main pool water filtration system (not shown). In one common form, the water flow is a positive pressure flow for hydraulically driving the internal drive means (not shown) and also for creating or inducing an upward suction or vacuum flow of water through a generally vertically oriented suction mast 24 on the pool cleaner 10 to vacuum particulate matter settled upon submerged pool surfaces. Alternative exemplary pool cleaners conforming generally hereto are shown and described in U.S. Pat. Nos. 5,863,425; 4,558,479; 4,589,986; and 3,822,754, which are also incorporated by reference herein.

In general terms, the disposable filter bag 10 is adapted for removable mounting onto a downstream or upper end of the suction mast 24, for receiving the upward column or flow of water and water-entrained debris discharged from the suction mast. In this regard, the filter bag 10 has a porous construction to permit upward flow-through passage of this water flow, with minimal or no significant flow obstruction, for return circulation of this water flow to the body of water within the swimming pool. However, the "effective mesh size" of the porous filter bag 10 is chosen to capture and retain the water-entrained particulate debris. This effective mesh size can be selected to optimize filtration of debris ranging from relatively small sand and silt to larger debris such as twigs and leaves. When desired, or when the filter bag 10 reaches a condition substantially filled with collected debris, the filter bag is removable from the pool cleaner suction mast 24 for disposal of the bag and the debris collected therein. A replacement filter bag 10 is then mounted onto the suction mast 24 for resumed pool cleaner operation.

Figure 2:
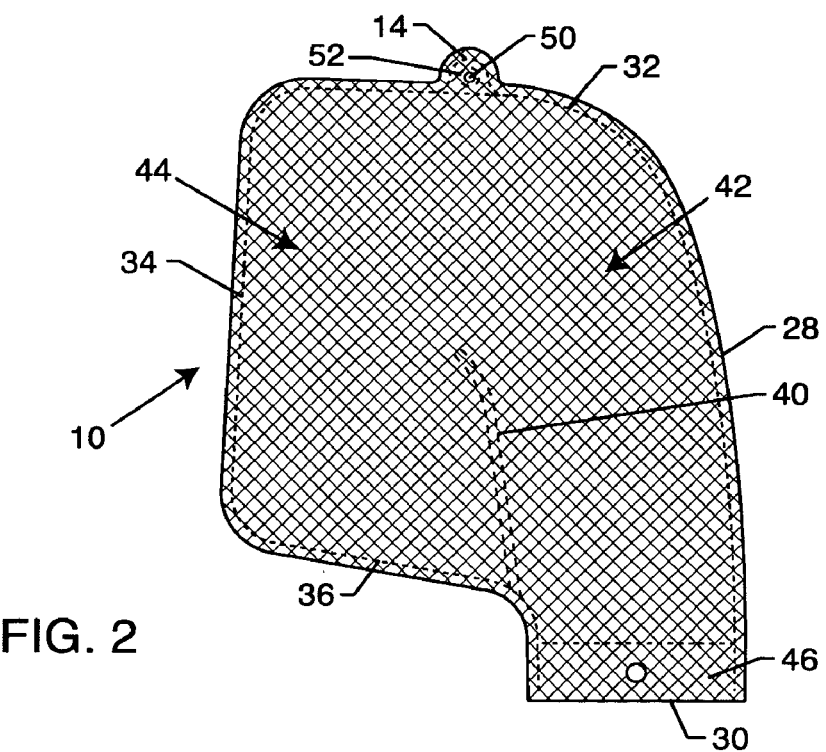
FIG. 2 is an enlarged side elevation view of the disposable filter bag.
Figure 3:
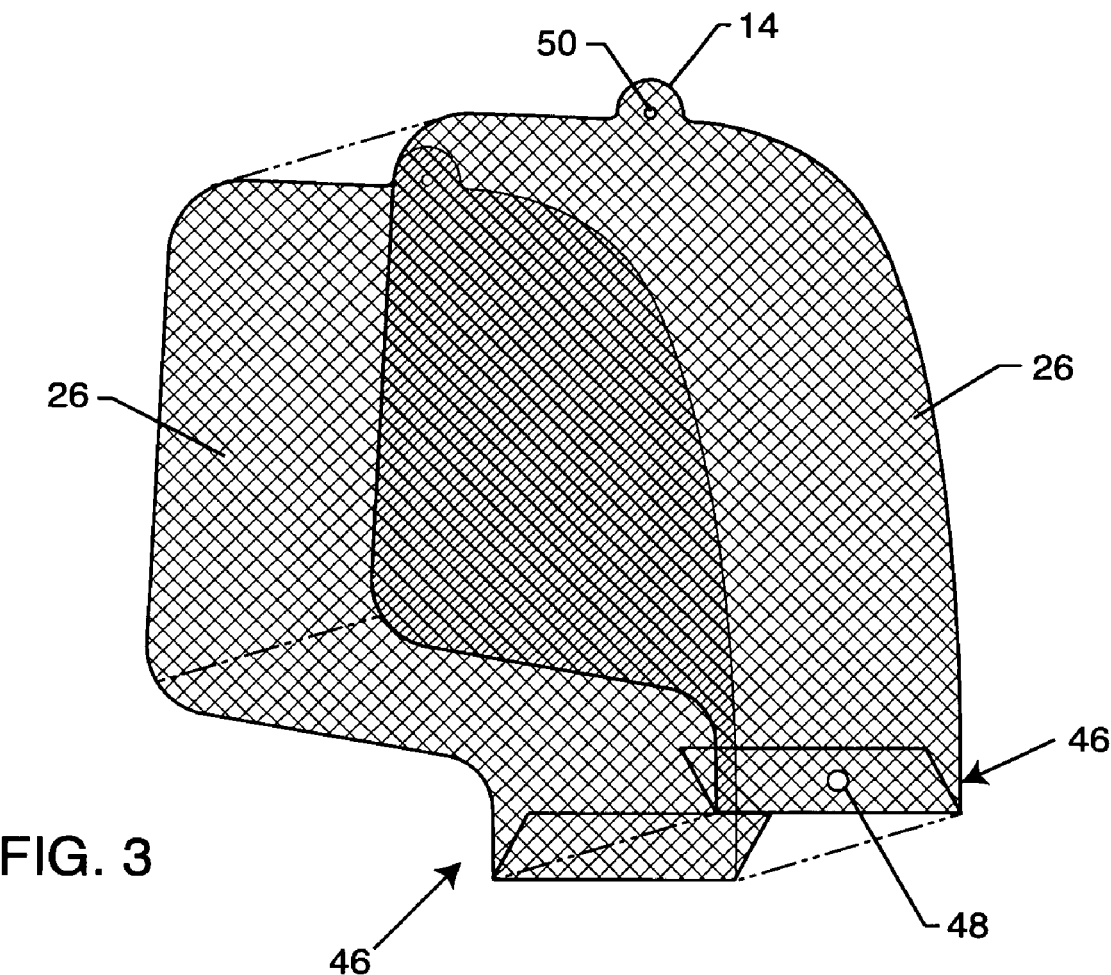
FIG. 3 is an exploded perspective view illustrating assembly of the disposable filter bag, in accordance with one preferred form thereof.

In accordance with the invention, and as shown best in FIGS. 2–3, the filter bag 10 is constructed from a pair of generally complementary-shaped sheets 26 (FIG. 3) of porous bag material of a type suitable for direct interconnection of marginal edges to define marginal seams, without requiring or using additional adhesive material such as a thermoplastic or heat-melt adhesive impregnated into or otherwise coated upon the bag material. Preferred porous bag materials include non-woven sheet material of selected porosity, such as a spunbond polymer suitable for direct-weld interconnection of marginal edges thereof as by heat or heat impulse seaming, or alternately by radio frequency (RF) or ultrasonic welding. One preferred bag material comprises a non-woven spunbond polypropylene. Alternative bag materials may include polyester-based materials and the like.

Figure 5:
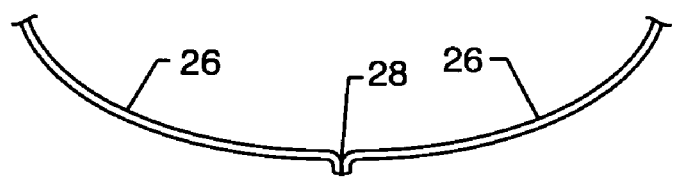
FIG. 5 is an enlarged fragmented sectional view taken generally on the line 5—5 of FIG. 4.

The sheets 26 of bag-forming material (FIG. 3) define opposite side walls or side panels of the filter bag 10, and are interconnected along the margins thereof to define secure and stable, relatively low profile seams. In the illustrative embodiment as shown, the sheets 26 are direct-weld connected to define a front seam or margin 28 which extends generally upwardly from a downwardly open bag mouth 30 disposed at a front and lower end of the filter bag 10. An upper end of the front seam 28 merges through a rearwardly curved segment with a generally rearwardly extending upper seam or margin 32, which in turn has a rearmost end merging with a downwardly extending rear seam or margin 34. The lowermost end of this rear seam 34 merges with a forwardly extending lower seam or margin 36 that terminates in spaced relation with a lower end of the front seam 28 and cooperates therewith to define the open bag mouth 30. Each of these seams 28, 32, 34 and 36 is beneficially formed by direct welding, as described above, to provide a low profile seam configuration having minimal overlapping interconnected sheet surfaces, and with little or no extraneous bag material protruding outwardly beyond the associated seam, as viewed in section in FIG. 5 relative to the front seam 28. In alternative filter bag configurations, a single sheet of bag material may be provided and appropriately folded upon itself to form one of the marginal edges of the bag, thereby providing one seamless margin as disclosed in U.S. Pat. No. 4,618,420, which is incorporated by reference herein.

Figure 4:
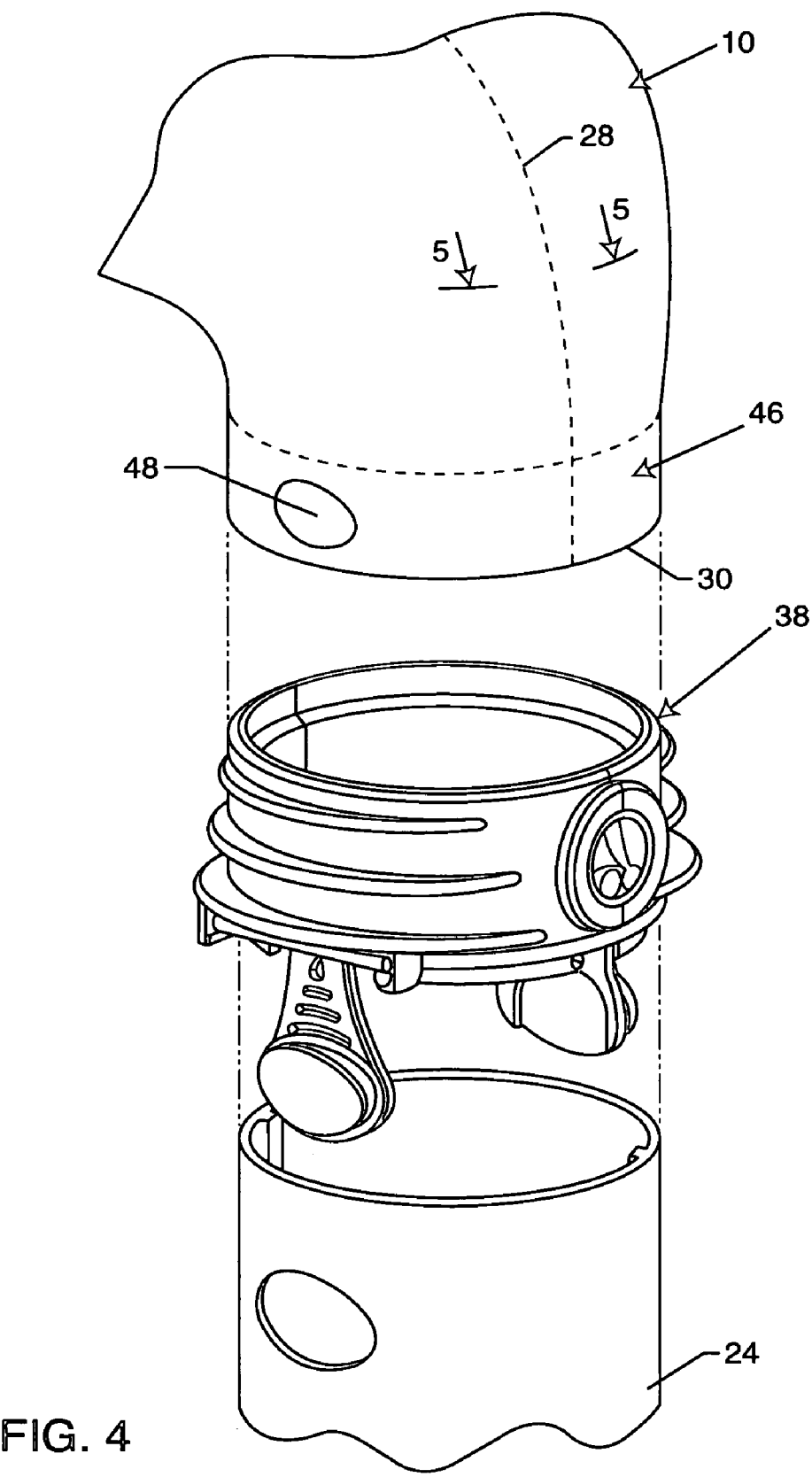
FIG. 4 is an enlarged, fragmented and exploded perspective view showing removable mounting of the disposable filter bag onto the pool cleaner.

The bag mouth 30 is adapted for removable mounting relative to the upper end of the pool cleaner suction mast 24, by suitable mounting means such as a mounting collar 38 (FIGS. 1 and 4) of generally cylindrical shape. This mounting collar 38 may comprise a clamp-type collar of the type depicted in FIG. 4, and as shown and described in U.S. Pat. Nos. D468,067 and 6,740,233, which are incorporated by reference herein. Alternately, the mounting collar 38 may be constructed according to U.S. Pat. Nos. 4,563,425 and D409,341, which are also incorporated by reference herein, or in the form of a flexible or other collar configuration adapted for removable mounting onto the supply mast 24 with the bag mouth 30 positioned to receive the upward column of water and water-entrained debris during pool cleaner operation.

In addition, the hollow bag interior may be subdivided by means of a centrally positioned, upstanding divider such as a divider seam 40 (FIG. 2) which is also formed by direct-weld connection of the opposing sheets 26, to subdivide the bag into a front or primary chamber 42 for receiving the column of water and debris from the suction mast 24, and a rearward or secondary debris collection chamber 44 within which the particulate debris tends to settle for collection. In this regard, the divider seam 40 extends upwardly from the lower seam 36, generally at a rear side of the mouth 30, and terminates at a height spaced substantially below the upper seam 32 so that upper zones of the two chambers 42, 44 are in flow communication with each other.

A reinforced cuff 46 is formed by the assembled bag material to provide a zone of increased strength lining the bag mouth 30, for improved and secure coupling with the mounting collar 38. FIG. 3 shows the lower region of each sheet 26, at opposite sides of the mouth 30, folded inwardly and upwardly to from a region of double-layer or two-ply thickness. These two-ply regions are permanently formed upon direct-weld formation of the front and lower seams 32, 36 respectively as the front and rear margins of the open mouth 30. In addition, at least one of the sheets 26 may incorporate alignment means such as an alignment port 48 for registry with a matingly sized alignment pin (not shown) or the like formed on the mounting collar 38, thereby assuring assembly of the filter bag 10 with the mounting collar 38 in a correct, predetermined, rotationally front-facing orientation.

In accordance with a further aspect of the invention, the disposable filter bag 10 also incorporates the ported tab 14 formed integrally therewith, generally at an upper end thereof as an integral portion of the upper seam 32. This ported tab 14 protrudes upwardly from the top margin of the formed bag, with the upper seam 32 following the margin defined by the upwardly protruding tab 14. The tab 14 defines a laterally open port 50, with the inner diameter margin of this port 50 being lined by an additional direct-weld seam 52 (FIG. 2).

The port 50 in the tab 14 is positioned and sized for interconnection with a suitable support member 54 (FIG. 1) used for coupling the upper end of the filter bag to the pool cleaner supply hose 16 or the like. The support member 54 on the supply hose 16 may comprise a variety of different tie and/or clamp structures, with a slidably mounted hose clasp of the type shown and described in copending U.S. Provisional Application No. 60/496,867, which is incorporated by reference herein, being preferred. The support member 54 retains the filter bag 10 in a generally upright orientation on the pool cleaner particularly when the pool cleaner is turned off or the upward water flow through the suction mast 24 is otherwise interrupted, such as during a back-up maneuver. Accordingly, the support member 54 engages with the integral tab 14 to prevent the filter bag 10 from draping downwardly over and about the pool cleaner 12 where the bag could otherwise become entangled in the cleaner wheels 20 and/or scrape against pool surfaces.

A variety of further modifications and improvements in and to the improved filter bag 10 of the present invention will be apparent to those persons skilled in the art. Accordingly, no limitation on the invention is intended by way of the foregoing description and accompanying drawings, except as set forth in the appended claims.

What is claimed is:

1. A pool cleaner filter bag for use with a pool cleaner having a mast for flow of water and water-entrained debris from a swimming pool or the like, said pool cleaner filter bag comprising:

at least two sheets of porous bag material interconnected along a plurality of marginal edges to define a hollow bag interior and an open mouth adapted for mounting relative to a discharge end of a pool cleaner mast, whereby a column of water and water-entrained debris discharged from the mast flows into said bag interior for debris capture therein;

at least some of said marginal edges comprising a seamed margin formed by direct weld interconnection of said sheets in the absence of additional adhesive material.

2. The pool cleaner filter bag of claim 1 wherein said porous bag material comprises a non-woven sheet material.

3. The pool cleaner filter bag of claim 1 wherein said porous bag material comprises a spunbond polymer.

4. The pool cleaner filter bag of claim 3 wherein said spunbond polymer comprises a non-woven spunbond polypropylene.

5. The pool cleaner filter bag of claim 1 wherein said at least two sheets of porous bag material comprise a pair of sheets interconnected in overlying relation along a front margin, a rear margin, an upper margin, and a lower margin, at least some of said margins comprising a seamed margin formed by direct weld interconnection of said sheets in the absence of additional adhesive material.

6. The pool cleaner filter bag of claim 5 wherein each of said margins comprises a seamed margin formed by direct weld interconnection of said sheets in the absence of additional adhesive material.

7. The pool cleaner filter bag of claim 5 further including a ported tab formed integrally with at least one of said seamed margins.

8. The pool cleaner filter bag of claim 5 wherein said upper margin comprises said one of said seamed margins.

9. The pool cleaner filter bag of claim 1 further including a divider for subdividing said bag interior into a primary chamber having a lower end in flow communication with said mouth, and a secondary debris collection chamber having an upper end in flow communication with an upper end of said primary chamber.

10. The pool cleaner filter bag of claim 9 wherein said divider comprises a divider seam formed by direct weld interconnection of said sheets in the absence of additional adhesive material.

11. The pool cleaner filter bag of claim 1 further including means for mounting said mouth onto a discharge end of a pool cleaner mast.

12. The pool cleaner filter bag of claim 11 wherein said mounting means comprises a mounting collar removably connected to said mouth.

13. A pool cleaner filter bag for use with a pool cleaner having a mast for flow of water and water-entrained debris from a swimming pool or the like, said pool cleaner filter bag comprising:

a pair of sheets of porous bag material interconnected in overlying relation along a front margin, an upper margin, a rear margin, and a lower margin to define a hollow bag interior, and further to define an open mouth formed in said lower margin generally adjacent said front margin, said mouth being adapted for mounting relative to a discharge end of a pool cleaner mast, whereby a column of water and water-entrained debris discharged from the mast flows into said bag interior for debris capture therein;

at least some of said margins comprising a seamed margin formed by direct weld interconnection of said sheets in the absence of additional adhesive material.

14. The pool cleaner filter bag of claim 13 wherein said porous bag material comprises a non-woven sheet material.

15. The pool cleaner filter bag of claim 13 wherein said porous bag material comprises a spunbond polymer.

16. The pool cleaner filter bag of claim 15 wherein said spunbond polymer comprises a non-woven spunbond polypropylene.

17. The pool cleaner filter bag of claim 13 further including a ported tab formed integrally with at least one of said seamed margins.

18. The pool cleaner filter bag of claim 13 wherein said upper margin comprises said one of said seamed margins.

19. The pool cleaner filter bag of claim 13 further including a divider for subdividing said bag interior into a primary chamber having a lower end in flow communication with said mouth, and a secondary debris collection chamber having an upper end in flow communication with an upper end of said primary chamber.

20. The pool cleaner filter bag of claim 19 wherein said divider comprises a divider seam formed by direct weld interconnection of said sheets in the absence of additional adhesive material.

21. The pool cleaner filter bag of claim 13 further including means for mounting said mouth onto a discharge end of a pool cleaner mast.

22. The pool cleaner filter bag of claim 21 wherein said mounting means comprises a mounting collar removably connected to said mouth.

23. A method of manufacturing a pool cleaner filter bag, comprising the steps of:

interconnecting at least two sheets of porous bag material along a plurality of marginal edges to define a hollow bag interior and an open mouth adapted for mounting relative to a discharge end of a pool cleaner mast, whereby a column of water and water-entrained debris discharged from the mast flows into said bag interior for debris capture therein;

said interconnecting step including direct weld connection of the sheets along at least some of said marginal edges, in the absence of additional adhesive material.

24. The method of claim 23 wherein the porous bag material comprises a non-woven sheet material.

25. The method of claim 23 wherein the porous bag material comprises a spunbond polymer.

26. The method of claim 23 wherein said the porous bag material comprises a non-woven spunbond polypropylene.

27. The method of claim 23 wherein said direct weld connection step comprises radio frequency welding.

28. The method of claim 23 wherein said direct weld connection step comprises ultrasonic welding.

29. The method of claim 23 further including the step of forming a ported tab formed integrally with at least one of the direct weld-formed marginal edges.

30. The method of claim 23 wherein said interconnecting step comprises interconnecting a pair of sheets of porous bag material in overlying relation along a front margin, a rear margin, an upper margin, and a lower margin, and further to define the open mouth formed in the lower margin generally adjacent the front margin, at least some of direct weld-connected marginal edges comprising a seamed margin formed by direct weld connection of said sheets in the absence of additional adhesive material.

31. The method of claim 30 further including the step of forming a divider for subdividing the bag interior into a primary chamber having a lower end in flow communication with the mouth, and a secondary debris collection chamber having an upper end in flow communication with an upper end of the primary chamber.

32. The method of claim 31 wherein said divider forming step comprises forming a divider seam by direct weld interconnection of the sheets in the absence of additional adhesive material.

* * * * *